May 5, 1953     A. J. BENT     2,637,340
PRESSURE CONTROL VALVE DEVICE
Original Filed July 22, 1947
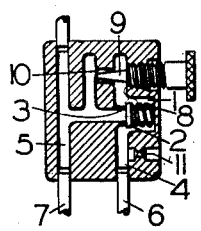
INVENTOR.
ARTHUR J. BENT
BY
*Frank E. Miller*
ATTORNEY Patented May 5, 1953

2,637,340

UNITED STATES PATENT OFFICE 2,637,340

PRESSURE CONTROL VALVE DEVICE

Arthur J. Bent, Penn Township, Pa., assignor to Westinghouse Air Brake Company, a corporation of Pennsylvania Original application July 22, 1947, Serial No. 762,771, now Patent No. 2,608,052, dated August 26, 1952. Divided and this application June 15, 1948, Serial No. 33,045

1 Claim. (Cl. 137—583)

This invention relates to pressure control valve devices of the type arranged to provide, from a source of fluid at highly fluctuating pressure, a substantially constant mean of the fluctuating pressure for control purposes, the present invention being a division of my copending application, Serial No. 762,771, filed July 22, 1947, now Patent No. 2,608,052 issued August 26, 1952.

More specifically, in the copending application relating to control apparatus for a free piston gas generator, an operator's control device is arranged to regulate the amount of air in a bounce chamber of the generator in which chamber the pressure of the air fluctuates between extreme limits during operation of the generator. It is desirable to employ a "mean" of this fluctuating pressure as a control pressure in the operator's control device and the principal object of the invention is the provision of improved means for accomplishing this result.

Other objects and advantages will become apparent from the following more detailed description of the invention.

In the accompanying drawing the single figure is a sectional view of a pressure control valve device embodying the invention.

As shown in the drawing, the pressure control valve device comprises a casing having a chamber 1 containing a check valve 2 arranged to cooperate with a seat 3 for closing communication from a passage 4 in the casing to a passage 5 in the casing. The passage 4 is open to chamber 1 and also to a control pipe 6 in which it is desired to hold a substantially constant pressure. The passage 5 is connected to a pipe 7 in which pressure of fluid is adapted to fluctuate. A bias spring 8 in chamber 1 acts on check valve 2 for urging it to its seat.

A choke valve 9 adjustably mounted in the casing cooperates with an opening 10 in the casing to provide a restricted communication by-passing the check valve 2 and thereby connecting chamber 1 with passage 5. The casing also has a restricted or choked communication 11 connecting passage 4 to atmosphere.

In operation, when the pressure of fluctuating fluid in pipe 7 and passage 5 exceeds the pressure of fluid in chamber 1 and passage 4, the check valve 2 will be unseated by the higher pressure to permit flow of fluid under pressure from passage 5 past said check valve to chamber 1 and passage 4, and when of a lesser degree the check valve 2 will be closed by spring 8 to prevent reverse flow of fluid under pressure past it. Under the latter condition fluid under pressure will, however, flow from chamber 1 and passage 4 to passage 5 and pipe 7 past the choke valve 9 at a rate determined by the adjustment of said valve. Thus as the pressure of fluid in pipe 7 and passage 5 fluctuates there will alternately be a flow of fluid under pressure to pipe 6 and a restricted release of fluid under pressure therefrom, with the result, that a substantially constant "mean" of the fluctuating pressure in pipe 7 will be maintained in pipe 6. Another reason for choke valve 9 is to permit the "mean" pressure in pipe 6 to increase or decrease, as the case may be, in accordance with an adjusted change of the range of pressure fluctuations in pipe 7.

The choked communication 11 provides for a constant restricted flow of fluid under pressure from passage 4 to atmosphere for the purpose of blowing from said passage any dirt or foreign matter which otherwise might tend to flow along with fluid from said passage to choke valve 9 and tend to clog the passage around said valve.

It is desired to point out that the choke communication 11 could, if desired, embody the function of choke valve 9 in which case said valve and the by-pass communication with which said valve cooperates could be dispensed with.

Having now described the invention, what I claim as new and desire to secure by Letters Patent, is:

A control structure for providing in a casing outlet passage a "mean" of a fluctuating pressure in a casing inlet passage open to said outlet passage, a check valve in said casing for permitting flow of fluid under pressure in the direction from said inlet passage to said outlet passage but arranged to prevent reverse flow of such fluid under pressure, a constantly open restricted communication in said casing connecting said outlet passage to said inlet passage around said check valve, and a restricted atmospheric vent in said casing open to said outlet passage.

ARTHUR J. BENT.

References Cited in the file of this patent

UNITED STATES PATENTS

| Number | Name | Date |
|---|---|---|
| 1,239,929 | Mecham | Sept. 11, 1917 |
| 1,377,878 | French | Mar. 10, 1921 |
| 1,509,508 | Grunwald | Sept. 23, 1924 |
| 1,801,407 | Barks | Apr. 21, 1931 |
| 1,853,329 | Austin | Apr. 12, 1932 |
| 1,909,469 | Hubbard | May 16, 1933 |
| 1,923,127 | Veenschoten | Aug. 22, 1933 |
| 2,214,290 | Ward | Sept. 10, 1940 |
| 2,273,118 | Langdon | Feb. 17, 1942 |
| 2,417,217 | Schreck | Mar. 11, 1947 |
| 2,475,783 | Gibbo | July 17, 1949 |